H. BUTNER & J. J. RAY.
HAY-GATHERER.
No. 185,488. Patented Dec. 19, 1876.
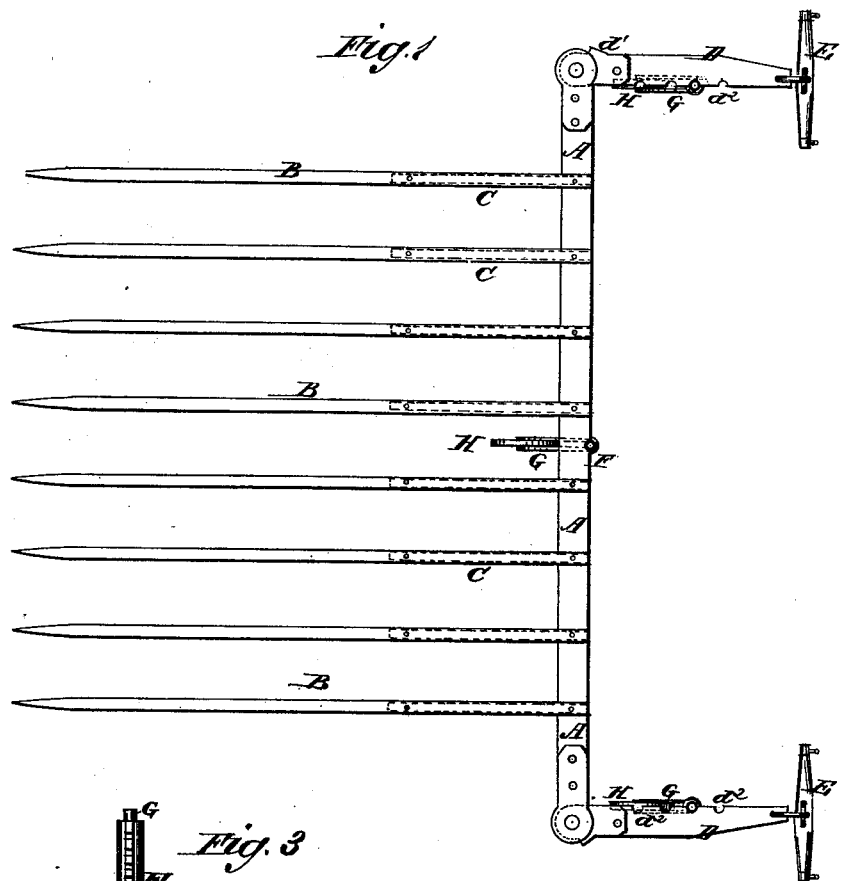
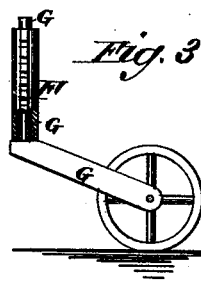
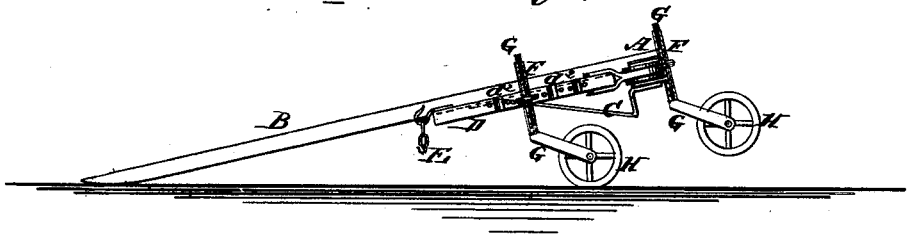

UNITED STATES PATENT OFFICE.

HARLIN BUTNER AND JAMES J. RAY, OF CLARENCE, MISSOURI.

IMPROVEMENT IN HAY-GATHERERS.

Specification forming part of Letters Patent No. 185,488, dated December 19, 1876; application filed September 30, 1876.

*To all whom it may concern:*

Be it known that we, HARLIN BUTNER and JAMES J. RAY, of Clarence, county of Shelby and State of Missouri, have invented a new and Improved Horse Hay-Rake, of which the following is a specification:

Figure 1 is a top view of our improved rake, the draft-bars being shown in position for withdrawing the rake from its load. Fig. 2 is a side view of the same, shown in position for collecting the hay. Fig. 3 is a detail view of one of the adjustable caster-wheels.

Similar letters of reference indicate corresponding parts.

The object of this invention is to furnish an improved rake for collecting the hay and drawing it to the stack, which shall so be constructed that the weight of the load will raise the points of the teeth from the ground, so that they will not catch, and so that it may be readily withdrawn from the load when desired.

The invention consists in the combination of the two hinged draw-bars, provided with the shoulders, and the notches, and the three adjustable caster-wheels, with the cross bar or head of the rake, as hereinafter fully described.

A is the cross bar or head of the rake, which may be made of any desired length, and to which the rake-teeth B are attached.

The rake-teeth B may be made of any desired length, and the connection between them and the cross-bars A is strengthened by braces C. To the ends of the cross-bar A are hinged the ends of the two draw-bars D, to the outer ends of which are attached the whiffletrees E. The draw-bars D are provided with a shoulder, $d^1$, to strike against the bar A when the said draw-bars D are turned forward, to prevent them from passing in any farther than to be parallel with the teeth B. In the side of the draw-bars D are formed notches $d^2$, in which are secured tubes F by U or hook bolts, so that the said tubes may be moved toward or from the inner ends of the said draw-bars by moving them from one to another of said notches. Several notches are formed in the sides of the tubes F to receive the bolts, so that the said tubes can be raised and lowered as desired. In the tubes F are swiveled the standards G of the caster-wheels H, which are thus made conveniently adjustable. To the center of the rear side of the cross bar or head A is secured a similar tube, F, standard G, and wheel H.

With this construction, when drawing the rake forward to collect the hay, the downward pressure of the hay will be upon the forward parts of the teeth B, and will hold the points of the teeth down to the ground, the central caster-wheel being raised from the ground, as shown in Fig. 2. When the loading is completed the load slips back upon the teeth, raising the points of the teeth, and bringing the central wheel down to the ground, so that the loaded rake will be transported upon the three wheels. When the loaded rake has been drawn to the stack, the horses are guided upon the opposite sides of the stack, and are then turned around outward or from the stack, and the rake is drawn out from beneath the load, and may be drawn back to collect another load while the previous load is being pitched upon the stack.

Having thus described our invention, we claim as new and desire to secure by Letters Patent—

The combination, with cross bar or head A, provided with teeth B, of the adjustable caster-wheel F, and the hinged draw-bars D, provided with shoulders $d^1$ and notches $d^2$, and adjustable caster-wheels G H, substantially as and for the purpose set forth.

HARLIN BUTNER.
JAMES J. RAY.

Witnesses:
JAMES H. POLLARD,
WILLIAM SHALE.